(12) United States Patent
Zhao et al.

(10) Patent No.: US 10,694,515 B2
(45) Date of Patent: Jun. 23, 2020

(54) SIGNAL PROCESSING METHOD, BASE STATION AND TERMINAL

(71) Applicant: ZTE CORPORATION, Shenzhen, Guangdong Province (CN)

(72) Inventors: Yajun Zhao, Shenzhen (CN); Linmei Mo, Shenzhen (CN); Hanqing Xu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 181 days.

(21) Appl. No.: 15/505,615

(22) PCT Filed: Feb. 11, 2015

(86) PCT No.: PCT/CN2015/072791
§ 371 (c)(1),
(2) Date: Feb. 22, 2017

(87) PCT Pub. No.: WO2015/131749
PCT Pub. Date: Sep. 11, 2015

(65) Prior Publication Data
US 2018/0219667 A1 Aug. 2, 2018

(30) Foreign Application Priority Data
Aug. 22, 2014 (CN) .......................... 2014 1 0419466

(51) Int. Cl.
*H04L 5/00* (2006.01)
*H04L 5/14* (2006.01)
(Continued)

(52) U.S. Cl.
CPC ......... *H04W 72/0446* (2013.01); *H04L 5/001* (2013.01); *H04L 5/0048* (2013.01);
(Continued)

(58) Field of Classification Search
CPC ........ H04J 2011/0003–002; H04L 5/0001–26; H04L 27/26; H04L 27/0006;
(Continued)

(56) References Cited

U.S. PATENT DOCUMENTS

| 2011/0122823 A1* | 5/2011 | Chen | H04W 24/10 370/328 |
| 2014/0044105 A1* | 2/2014 | Bontu | H04W 24/10 370/329 |
| 2015/0245346 A1* | 8/2015 | Yokomakura | H04W 24/10 370/329 |

FOREIGN PATENT DOCUMENTS

| CN | 101378305 A | * | 3/2009 |
| CN | 101378305 A | | 3/2009 |

(Continued)

*Primary Examiner* — Timothy J Weidner
(74) *Attorney, Agent, or Firm* — Cantor Colburn LLP

(57) ABSTRACT

An information processing method, a corresponding base station and terminal are disclosed. The method includes presetting a subframe structure comprising at least a first time slot and a second time slot, herein the first time slot is used for transmission of a downlink signal; or is idle; or is switched to reception of an uplink signal and schedules transmission of the uplink signal or does not schedule transmission of the uplink signal; or is switched to reception of a signal for only performing reception and measurement of other signals but does not schedule transmission of the uplink signal; and the second time slot is used for reception of an uplink signal and schedules transmission of the uplink signal; or is idle, or is switched to reception of a signal for only performing measurement but does not schedule the uplink signal.

21 Claims, 2 Drawing Sheets

(51) Int. Cl.
*H04L 27/00* (2006.01)
*H04L 27/26* (2006.01)
*H04W 24/02* (2009.01)
*H04W 72/04* (2009.01)
*H04W 72/12* (2009.01)
*H04W 88/08* (2009.01)
*H04W 92/10* (2009.01)

(52) U.S. Cl.
CPC .......... *H04L 5/0082* (2013.01); *H04L 5/0092* (2013.01); *H04L 5/14* (2013.01); *H04L 5/1438* (2013.01); *H04L 5/1469* (2013.01); *H04W 24/02* (2013.01); *H04W 72/0406* (2013.01); *H04W 72/1205* (2013.01); *H04W 72/1289* (2013.01); *H04L 27/0006* (2013.01); *H04L 27/26* (2013.01); *H04L 27/2602* (2013.01); *H04W 88/08* (2013.01); *H04W 92/10* (2013.01)

(58) Field of Classification Search
CPC ............... H04L 27/2602; H04L 27/32; H04W 24/02–24/10; H04W 72/005–14; H04W 88/02–88/12; H04W 92/10
See application file for complete search history.

(56) References Cited

FOREIGN PATENT DOCUMENTS

| | | |
|---|---|---|
| CN | 101888699 A | 11/2010 |
| CN | 101931456 A | 12/2010 |
| EP | 2696530 A2 * | 2/2014 |
| EP | 2696530 A2 | 2/2014 |
| JP | 2014-101527 A | 6/2014 |
| RU | 2437172 C1 | 12/2011 |
| WO | 2007053125 A1 | 5/2007 |
| WO | WO2013116127 A1 | 8/2013 |
| WO | 2014109302 A1 | 7/2014 |

* cited by examiner

SIGNAL PROCESSING METHOD, BASE STATION AND TERMINAL

TECHNICAL FIELD

The present document relates to the Long Term Evolution (LTE)-Unlicensed technology, and in particular, to a signal processing method, a base station and a terminal based on an LTE-Unlicensed system.

BACKGROUND

The Long Term Evolution-Unlicensed (LTE-U) refers to deployment of the LTE in an unlicensed spectrum to meet the increasing capacity requirements of LTE systems and improve the efficiency of the utilization of the unlicensed spectrum, and is a possible important direction of evolution for the LTE and future wireless communications. In the design of the LTE-U, it needs to consider how to fairly compete for the unlicensed spectrum with different systems such as WiFi, radar, etc. and the same system such as the LTE-U for data transmission.

According to the presentation of the 3GPP standard conference, the LTE-U system may also be referred to as an LTE Licensed Assisted Access (LAA) system for a licensed carrier assisted scenario. Currently, there are the following manners for the LTE-U to utilize the unlicensed spectrum: Carrier Aggregation Supplemental Downlink (CA SDL), Carrier Aggregation Time Division Duplex (CA TDL), and Standalone manners. Herein, the CA SDL is the mainstream manner at present, and in the related scheme, a base station can only transmit downlink data without uplink reception. That is, the base station can only receive a measurement quantity reported by a UE based on a licensed carrier, which is not timely enough. An existing delay may influence the competition for the unlicensed carrier with WiFi, and during within this time period, WiFi may have preempted resources.

With respect to this problem, currently, the Time Division Multiplexing (TDM) manner is primarily used for transmission of signals. For example, a half of a radio frame is occupied and the remaining half thereof is reserved for use by WiFi. This means that a mechanism of monitoring first and then speaking is not used, which can influence other systems that use unlicensed carriers, such as WiFi, thereby resulting in the problem of unfair use of the unlicensed carrier spectrum.

SUMMARY

The technical problem to be solved by the present document is to provide a signal processing method, a base station and a terminal, which can improve the fair use of the unlicensed carrier spectrum, thereby effectively utilizing the unlicensed carrier spectrum.

In order to solve the abovementioned technical problem, the following technical solutions are used.

A signal processing method includes:

presetting a subframe structure comprising at least a first time slot and a second time slot, herein the first time slot is used for transmission of a downlink signal; or is idle; or is switched to reception of an uplink signal and schedules transmission of the uplink signal or does not schedule transmission of the uplink signal; or is switched to reception of a signal for only performing reception and measurement of other signals except for the uplink signal but does not schedule transmission of the uplink signal.

The second time slot is used for reception of an uplink signal and schedules transmission of the uplink signal; or is idle, or is switched to reception of a signal for only performing measurement but does not schedule the uplink signal.

The base station performs signal reception and transmission based on the set subframe structure.

Alternatively, the subframe structure further includes a third time slot which is used for preemption of radio resources.

Alternatively, the subframe structure further includes a fourth time slot which is used for transmission of indication information.

Alternatively, each of the first time slot, the second time slot, the third time slot and the fourth time slot is included of one or more Orthogonal Frequency Division Multiplexing (OFDM) symbols, or is included of incomplete OFDM symbols.

Alternatively, the method further includes a terminal UE performing signal reception and transmission based on the subframe structure.

Alternatively, the subframe structure is set based on an LTE subframe structure.

Alternatively, the subframe structure is an LTE downlink subframe structure.

The step of presetting a subframe structure includes selecting OFDM symbols in the LTE downlink subframe structure except for a mapped Cell-specific Reference Signal (CRS), Channel State Information Reference Signal (CSI-RS), Demodulation Reference Signal (DMRS), or Primary Synchronization Signal (PSS)/Secondary Synchronization Signal (SSS) symbol, to be reserved as the second time slot.

Alternatively, the subframe structure is an LTE downlink subframe structure.

The step of presetting a subframe structure includes selecting OFDM symbols after one or more OFDM symbols from a subframe starting point in the LTE downlink subframe structure as a starting point of the second time slot.

Alternatively, the subframe structure is an LTE downlink subframe structure; and.

The step of presetting a subframe structure includes reserving OFDM symbols of a control domain of the LTE downlink subframe structure as the second time slot.

Alternatively, the step of reserving OFDM symbols of a control domain of the LTE downlink subframe structure as the second time slot includes reserving the second time slot from a second OFDM symbol of a subframe of the OFDM symbols of the control domain.

Alternatively, the subframe structure further includes a fourth time slot which is used for transmission of indication information.

The step of presetting a subframe structure includes setting the fourth time slot to include a first OFDM symbol of the control domain.

Alternatively, the fourth time slot of the subframe structure is used for transmission of the following indication information:

indication information for indicating downlink indication information for reservation of an uplink time slot;

and/or indication information for indicating a number of symbols occupied by the control domain;

and/or indication information for indicating a structure type of the present subframe;

and/or indication information for indicating a specific structure of the present subframe;

and/or indication information for indicating configuration information of a subframe structure of subsequent transmission;

and/or indication information for indicating scheduling information for transmitting an unlicensed carrier.

Alternatively, the fourth time slot multiplexes a Physical Control Format Indicator Channel (PCFICH) channel or multiplexes a PCFICH channel.

Alternatively, for an OFDM symbol where a CRS of the control domain is located, if the first OFDM symbol of the control domain is configured as an uplink time slot, the method further include includes: indicating to the UE that downlink measurement can no longer be performed based on the OFDM symbol. Alternatively, the subframe structure is an LTE uplink subframe structure.

The step of presetting a subframe structure includes selecting OFDM symbols in the LTE uplink subframe structure except for a mapped SRS or DMRS symbol, to be reserved as the first time slot.

Alternatively, the subframe structure is a newly added subframe structure including n OFDM symbols. Herein, the step of presetting a subframe structure include includes using k OFDM symbols of the newly added subframe structure as the first time slot and using remaining (n−k) OFDM symbols as the second time slot.

Herein n is a number of ODFM symbols corresponding to Y LTE subframes, where Y∈{0.5, 1, 2, 3, 4, 5, 6, 7, 8 9, 10}, and n and k are natural numbers or positive decimals.

Alternatively, the k OFDM symbols are first k OFDM symbols of the newly added subframe structure.

Alternatively, the subframe structure further includes a third time slot which is used for preemption of radio resources.

m OFDM symbols in the new subframe structure are the third time slot, and at this moment, (n−k−m) OFDM symbols in the subframe structure are the second time slots, herein m is a natural number or a positive decimal.

Alternatively, a value of k is a preset fixed value.

Or the value of k meets k≤X, and it is satisfied that s consecutive OFDM symbols are detected to be idle before the value of k reaches a maximum value X, where s≤k, and s and X are both preset natural numbers or positive decimals.

Alternatively, the subframe structure is set based on an LTE TDD subframe structure.

The step of presetting a subframe structure include includes setting $k_T$ OFDM symbols in a Downlink Pilot Time Slot (DwPTS) in the TDD subframe structure to be the second time slot, and setting $n_T$ OFDM symbols in an Uplink Pilot Time Slot (UpPTS) in the TDD subframe structure to be the first time slot, where $k_T$ and $n_T$ are natural numbers or positive decimals.

Alternatively, the subframe structure further includes a third time slot which is used for preemption of radio resources.

The step of presetting a subframe structure further include includes using $m_T$ OFDM symbols in a time slot GP in the TDD subframe structure as the third time slot, herein $m_T$ is a natural number or a positive decimal.

Alternatively, the method further include includes presetting a period of L, and configuring M(N>=0) said subframe structures in each period L and a relative subframe offset N from a starting position of each period.

Herein the step of presetting a subframe structure includes as follows.

Setting L=1, herein each subframe in each period L has the sub-frame structure.

Setting L=10 or 5, with a period of a radio frame/a half of the radio frame.

Or other subframes in the radio frame are set, except for 0 and 5, as the subframe structure.

Or the special subframes of the TDD are configured as the subframe structure.

Or candidate subframes in Enhancement Interference Management and Traffic Adaptation (eMITA) which can be dynamically configured as DL are configured as the subframe structure.

Setting N∈{0, 1, . . . , L−1}.

Setting M=1.

or M consecutive said subframes;

or M equally spaced subframes.

Alternatively, the step of the base station performing signal reception and transmission based on the set subframe structure include includes the base station performing configuration of a subframe pattern based on the set subframe structure.

The base station notifies the UE of the configured subframe pattern.

The base station performs signal reception and transmission according to the set subframe structure and the configured subframe pattern.

Alternatively, the step of the base station performing configuration of a subframe pattern based on the set subframe structure include includes as follows.

determination and configuration is uniformly performed by Operation Administration and Maintenance (OAM).

Or management and configuration is performed by a cell corresponding to a licensed carrier to which the unlicensed carrier is attached.

Or configuration is performed by other unlicensed carriers in a group of unlicensed carriers.

Or coordination and configuration is uniformly performed by a certain central node, herein the central node is a base station/cell.

Alternatively, the step of the base station performing configuration of a subframe pattern based on the set subframe structure include includes as follows.

The base station performs configuration of the subframe pattern of the set subframe structure when the base station performs resource awareness and/or preemption for an unlicensed carrier.

The base station temporarily does not perform configuration of the subframe pattern of the set subframe structure during the base station performs measurement awareness and/or preemption on an unlicensed carrier, and performs configuration of the subframe pattern of the set subframe structure on the unlicensed carrier when the base station performs measurement awareness and completes resource preemption for the unlicensed carrier at any time.

Or the base station always performs signal transmission and reception according to the set subframe structure when the base station processes an unlicensed carrier;

Or indicating whether one subframe is configured to have the set frame structure in first i OFDM symbols of the subframe.

Alternatively, the step of the base station notifies the UE of the configured subframe pattern includes as follows.

When an unlicensed carrier is added as a secondary carrier, the subframe pattern of the set subframe structure is configured by a licensed carrier as a primary carrier and notifies the UE of the configured subframe pattern.

Or the configured subframe pattern is notified to UE by the secondary carrier itself; Or the configured subframe pattern is notified to the UE on other unlicensed carriers within a group of unlicensed carriers.

Alternatively, when the set subframe structure is suitable for an unlicensed carrier, the following cases are included.

When the subframe pattern is configured, for carriers managed by the same licensed carrier, subframe types thereof are uniformly configured with the same subframe pattern, and the step of notifying the UE of the set subframe pattern include includes uniformly notifying the UE once by the licensed carrier. When a new secondary carrier is added, the UE considers that the subframe configuration of the newly added carrier is the same as the notified configuration by default.

When the subframe pattern is configured, for the carriers managed by the same licensed carrier, the subframe types thereof are configured with different subframe patterns, and the step of notifying the UE of the set subframe pattern includes uniformly performing configuration per a cell set, and notifying the UE. Or a frequency subband is used as a unit, a plurality of carriers in a frequency subbands have the same configuration in units of, and the UE is notified.

Alternatively, the step of the base station transmitting a downlink signal according to the set subframe structure and monitoring a received uplink signal include includes as follows.

When another downlink subframe of the set subframe structure is switched to a downlink transmission mode, the base station performs transmission of the downlink signal.

When the set subframe structure is switched to an uplink reception mode, the base station monitors the received signal.

Alternatively, the step of the UE performing signal reception and transmission includes: configuring the UE to perform reception only.

And/or, the UE performs transmission of the uplink signal only in an uplink time slot of the subframe structure for which the subframe pattern is configured;

And/or the UE performs transmission of the uplink signal at other times of the uplink time slot of the subframe structure for which the subframe pattern is not configured.

Alternatively, the method further includes: the UE selecting to perform signal reception and transmission in different manners in different phases during the signal reception and transmission.

Alternatively, the method further includes, when the base station has preempted an unlicensed carrier resource, a subframe is configured to have the subframe structure in use.

In the OFDM symbols of the subframe structure, the base station switches downlink transmission to uplink reception and monitors the uplink signal using the reserved OFDM symbols.

Alternatively, if it is found through the monitoring that there is no other system signal, continuing to occupy the unlicensed carrier and indicating to the UE whether the current subframe is still available or whether the period is still available.

Alternatively, if a certain downlink OFDM symbol is not used to transmit data, the method further includes notifying the UE.

Alternatively, the method further includes, when the base station is in an initial preemption phase, in a scenario in which the OFDM symbols of the control domain are configured for uplink reception and resource preemption, performing measurement and preemption using the configured OFDM symbols. And if the preemption is successful, transmission of the downlink signal and downlink scheduling is performed in the current subframe.

Alternatively, the method further includes notifying the UE of whether to use the subframe structure and of the used subframe structure through a Physical Downlink Control Channel (PDCCH) of the licensed carrier.

The UE detects unlicensed carrier occupation information and the scheduling information in an enhanced Physical Downlink Control Channel (ePDCCH) domain.

Alternatively, the subframe structure is included of one or more consecutive LTE subframes.

The subframe structure is included of consecutive LTE half subframes.

A signal processing method includes presetting a subframe structure comprising at least a fifth time slot and a sixth time slot.

Herein the fifth time slot is used for transmission of an uplink signal; or is idle; or is switched to reception of a downlink signal and schedules transmission of the downlink signal or does not schedule transmission of the downlink signal; or is switched to reception of a signal for only performing reception and measurement of other signals but does not schedule transmission of the downlink signal.

The six time slot is used for reception of a downlink signal and schedules transmission of the downlink signal; or is idle, or is switched to reception of a signal for only performing measurement but does not schedule the downlink signal.

The UE performs signal reception and transmission based on the set subframe structure.

Alternatively, the subframe structure further includes a seventh time slot which is used for preemption of radio resources.

Alternatively, each of the fifth time slot, the sixth time slot and the seventh time slot is included of one or more Orthogonal Frequency Division Multiplexing (OFDM) symbols, or is included of incomplete OFDM symbols.

Alternatively, the method further includes a base station performing signal reception and transmission based on the subframe structure.

Alternatively, the step of presetting a subframe structure includes as follows.

The subframe structure is set to be included of n OFDM symbols.

Herein k OFDM symbols are set as the sixth time slot to be used for a UE downlink signal monitoring window. And m OFDM symbols are set as the seventh time slot to be used for a resource preemption window. And remaining (n−k−m) OFDM Symbols are set as the fifth time slot to be used for a resource occupation window for transmitting an occupation signal and/or an uplink reference signal, herein k, m and n are natural numbers or positive decimals.

Alternatively, the parameter m=0.

Alternatively, the subframe structure is an LTE TDD subframe structure; and

The step of presetting a subframe structure includes include setting $k_T$ OFDM symbols in a Downlink Pilot Time Slot (DwPTS) in the TDD subframe structure to be the sixth time slot for monitoring a downlink signal. $n_T$ OFDM symbols in an Uplink Pilot Time Slot (UpPTS) in the TDD subframe structure are set to be the fifth time slot for transmitting an occupation signal and/or an uplink reference signal, where $k_T$ and $n_T$ are natural numbers or positive decimals.

Alternatively, the step of presetting a subframe structure further include includes setting $m_T$ OFDM symbols in a GP in the TDD subframe structure to be the seventh time slot for preempting resources, herein $m_T$ is a natural number or a positive decimal.

Alternatively, in the LTE uplink subframe, a last OFDM symbol is set as the fifth time slot for transmitting an uplink Sounding Reference Signal (SRS), When it is found by the UE through monitoring that the carrier can be occupied, an occupation indication signal is transmitted in the last OFDM symbol of the subframe to notify the base station that the carrier can be occupied.

The method further includes that the base station acquiring the indication information from the UE that the carrier can be occupied by detecting the occupation signal transmitted in the OFDM symbol.

A base station is configured to preset a subframe structure including at least a first time slot and a second time slot.

The first time slot is used for transmission of a downlink signal; or is idle; or is switched to reception of an uplink signal and schedules transmission of the uplink signal or does not schedule transmission of the uplink signal; or is switched to reception of a signal for only performing reception and measurement of other signals except for the uplink signal but does not schedule transmission of the uplink signal.

The second time slot is used for reception of an uplink signal and schedules transmission of the uplink signal; or is idle, or is switched to reception of a signal for only performing measurement but does not schedule the uplink signal.

The base station is arranged to perform signal reception and transmission based on the set subframe structure.

Alternatively, the subframe structure further includes a third time slot which is used for preemption of radio resources.

Alternatively, each of the first time slot, the second time slot, the third time slot and the fourth time slot is included of one or more Orthogonal Frequency Division Multiplexing (OFDM) symbols, or is included of incomplete OFDM symbols.

A terminal is used for presetting a subframe structure comprising at least a fifth time slot and a sixth time slot.

Herein the fifth time slot is used for transmission of an uplink signal; or is idle; or is switched to reception of a downlink signal and schedules transmission of the downlink signal or does not schedule transmission of the downlink signal; or is switched to reception of a signal for only performing reception and measurement of other signals but does not schedule transmission of the downlink signal.

The six time slot is used for reception of a downlink signal and schedules transmission of the downlink signal; or is idle, or is switched to reception of a signal for only performing measurement but does not schedule the downlink signal.

Signal reception and transmission is performed based on the set subframe structure.

Alternatively, the subframe structure further includes a seventh time slot which is used for preemption of radio resources.

Alternatively, each of the fifth time slot, the sixth time slot and the seventh time slot is included of one or more Orthogonal Frequency Division Multiplexing (OFDM) symbols, or is included of incomplete OFDM symbols.

Compared with the related technology, the technical solution of the present application includes presetting a subframe structure including at least a first time slot and a second time slot, herein the first time slot is used for transmission of a downlink signal; or is not used for transmission of the downlink signal; or is switched to reception of an uplink signal and schedules transmission of the uplink signal or does not schedule transmission of the uplink signal; or is switched to reception of a signal for only performing reception and measurement of other signals but does not schedule transmission of the uplink signal; and the second time slot is used for reception of an uplink signal and schedules transmission of the uplink signal; or is not used for transmission of the uplink signal, or is switched to reception of a signal for only performing measurement but does not schedule the uplink signal; and the base station performing signal reception and transmission based on the set subframe structure. With the method according to the technical solutions of the present document, the fair use of the unlicensed carrier spectrum is improved, thereby effectively utilizing the unlicensed carrier spectrum.

Other features and advantages of the present document will be set forth in the description which follows and, in part, will be obvious from the description, or may be learned by practice of the present document. The purposes and other advantages of the present document can be realized and obtained through the structure particularly pointed out in the description, claims and accompanying drawings.

BRIEF DESCRIPTION OF DRAWINGS

The accompanying drawings described herein are intended to provide a further understanding of the present document and form a part of the present application. The illustrative embodiments of the present document and the description thereof are used to explain the present document and do not constitute an improper definition of the present document. In the accompanying drawings.

SPECIFIC EMBODIMENTS

Embodiments of the present document will be described in detail below with reference to accompanying drawings. It should be illustrated that the embodiments in the present application and the features in the embodiments can be combined with each other randomly without conflict.

Figure 1:
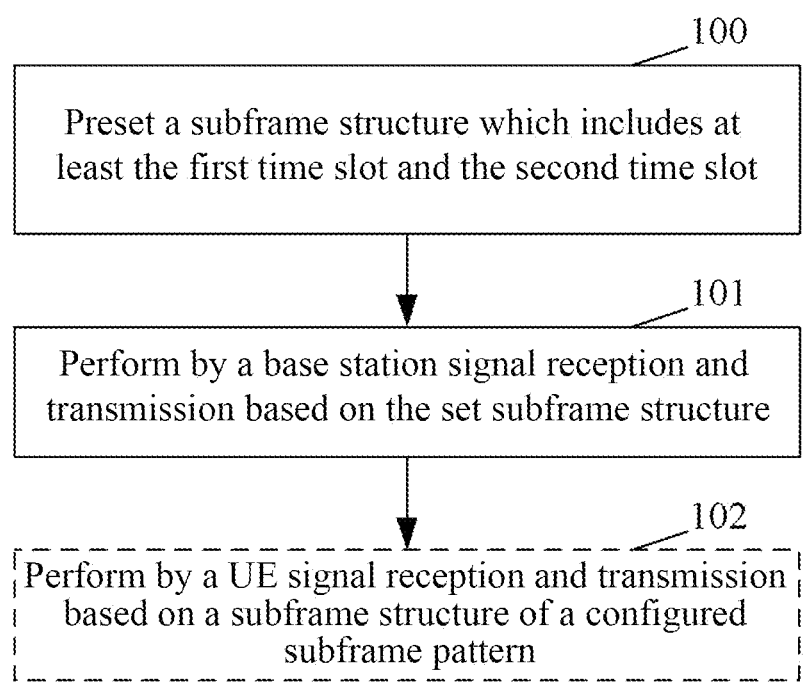
FIG. 1 is a flowchart of a signal processing method according to an embodiment of the present document.
Figure 2:
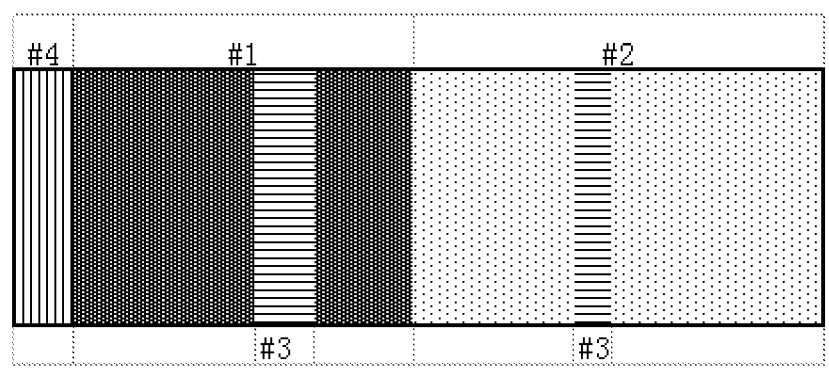

FIG. 1 is a flowchart of a signal processing method according to an embodiment of the present document. As shown in FIG. 1, the method includes the following steps.

In step 100, a subframe structure is preset, and the subframe structure includes at least a first time slot and a second time slot. Herein, the first time slot is used for transmission of a downlink signal; or is not used for transmission of the downlink signal, i.e., being idle; or is switched to reception of an uplink signal, and may schedule transmission of the uplink signal or does not schedule transmission of the uplink signal but is only switched to reception of the uplink signal for only reception and measurement of other signals expect for the uplink signal; or is switched to reception of a signal here for only reception and measurement of other signals expect for the uplink signal and does not schedule transmission of the uplink signal.

The second time slot is used for reception of an uplink signal and schedules transmission of the uplink signal; or is not used for reception of the uplink signal, i.e., being idle; or is switched to reception of a signal here for only measurement and does not schedule the uplink signal.

Compared with WiFi systems, a granularity of subframes is too large. If monitoring and measurement are performed with the subframe as a time granularity, a problem that a monitoring time is too long which results in an unnecessary waste of resources may occur. Further, as a monitoring time for WiFi is short, resources may be preempted by WiFi in the monitoring process of the LTE-U etc. In this step, monitoring and preemption are performed with the Orthogonal Frequency Division Multiplexing (OFDM) symbol bit as the granularity, herein the time granularity thereof is equivalent to that of WiFi, which can solve the problem that the preemption of LTE resources is disadvantage since the time granularity of WiFi is much smaller than the time granularity of the LTE subframe.

Step 100 may specifically set the subframe structure in one of the following three manners.

In step 100, a manner to set the subframe structure is that based on a related LTE subframe structure, a part of OFDM symbols may be configured as primary OFDM symbols, i.e., the first time slot, to transmit data, and a part of the OFDM symbols, i.e., the second time slot, may be configured not to transmit data, and instead, may be configured to monitor a signal.

Herein, the related LTE subframe structure is generally one millisecond in duration and is further included of a plurality of OFDM symbols (14 OFDM symbols for a regular subframe). First OFDM symbols of a downlink subframe are mapped to a control channel, i.e., a control domain, and other OFDM symbols are for a data domain. In an uplink subframe, the last OFDM symbol may generally be mapped to transmit an SRS (uplink data may be transmitted if the SRS is not transmitted), and other OFDM symbols are used to transmit uplink data.

Based on a scenario in which the subframe structure in this step is the downlink subframe structure of the LTE, OFDM symbols in the downlink subframe structure of the LTE except for a mapped Cell-specific Reference Signal (CRS), Channel-State Information Reference Signal (CSI-RS), or Demodulation Reference Signal (DMRS), or Primary Synchronization Signal/Secondary Synchronization Signal (PSS/SSS) symbol may be preferentially selected to be reserved for monitoring, that is, it is preferable to map the OFDM symbols of the data channel (i.e., OFDM for data only). In this step, these OFDM symbols are selected as the second time slot to realize the monitoring of the uplink signal, which reduces the influence on the related subframe structure, and better realizes the compatibility with the related licensed carrier protocol.

Except for the OFDM symbols which are selected as the second time slot, other OFDM symbols are used as OFDM symbols occupied by the first time slot for transmission of downlink data.

Alternatively, the OFDM symbols for monitoring the uplink signal, i.e., the second time slot, are selectively reserved on the OFDM symbols of the control domain of the related LTE downlink subframe structure. With respect to a time length of a number of reserved symbols, by taking a processing delay of uplink and downlink switching into account, it is preferable that a total time length does not exceed a time length corresponding to a maximum number of configurable OFDM symbols in the control domain of the existing LTE downlink subframe. Here, it is preferable that the time length is configured to be compatible with the related LTE subframe structure as much as possible, mainly in consideration of the compatibility of mapping in the data domain. Alternatively, for a case in which the OFDM symbols of the control domain are used as the second time slot, reservation may be started from a second OFDM symbol of one subframe.

For an OFDM symbol in which the CRS of the control domain is located, if a first OFDM symbol of the control domain is also configured as an uplink time slot, the step further include includes indicating to the UE that downlink measurement can no longer be performed based on the OFDM symbol.

Based on a scenario in which the subframe structure in this step is the LTE uplink subframe structure, OFDM symbols in the LTE uplink subframe structure except for a mapped Sounding Reference Signal (SRS) or DMRS symbol may be preferentially selected to be reserved as the first time slot, which is an uplink idle time slot, i.e., uplink transmission is not performed therein:

(1) The uplink idle time slot is used by a base station to schedule transmission of a downlink signal, and the UE performs reception of the downlink signal in the time slot. Of course, downlink data may not be scheduled, and the UE may perform reception and measurement of other signals in this time slot. This implementation method realizes sufficient utilization of time slot resources for transmission of the downlink signal.

(2) The base station does not perform transmission of a downlink signal in the uplink idle time slot, and the UE performs reception and/or measurement of other signals in the time slot;

(3) The UE does not perform other processing in the uplink idle time slot.

In step 100, another manner to set the subframe structure is to newly add a complete subframe structure comprising n OFDM symbols, herein k OFDM symbols of the subframe, i.e. a second time slot, are configured for monitoring an uplink signal, and alternatively, the k OFDM symbols are first k OFDM symbols of the subframe. The remaining (n−k) OFDM symbols, i.e. the first time slot, are used to transmit downlink data. Further, m OFDM symbols (referred to as a third time slot) in the subframe structure are configured for resource preemption, in which case the (n−k−m) OFDM symbols, i.e., a first time slot, in the subframe are used for transmission of downlink data, where m, n, and k are natural numbers or positive decimals. Specifically, The first k OFDM symbols of the subframe are used for monitoring (a monitoring window). A value of k may be configured as a fixed value; or configured to satisfy s≤k≤X, that is, as long as it is consecutively monitored that s OFDM symbols are idle before k reaches a maximum value X, the frequency point is considered to be idle and can be occupied, in which case the monitoring window can be stopped and subsequent operations can be started. Herein, X is a preset value and the setting of X is related to the requirements for monitoring, and cannot exceed the maximum number of available OFDM symbols of the subframe. For special requirements that monitoring in a longer time is required, X may be configured so that OFDM symbols of multiple consecutive subframes are utilized. s is a preset value, and the setting of s is primarily based on a time when the frequency resources which is regulated by a policy to must be monitored are consecutively idle, where s, X and k are natural numbers or positive decimals.

m may be configured as m=0, that is, there is no resource preemption window. Or the time length of m OFDM symbols may also be used for resource preemption in the frequency band among a plurality of competitors, thus avoiding the conflict of resources.

The first time slot may be 0, i.e. the subframe structure does not contain the first time slot. This allows more time resources to be used as the second time slot and possibly a third time slot.

n is configured to correspond to a number of OFDM symbols of Y related LTE subframes, herein Y∈{0.5, 1, 2, 3, 4, 5, 6, 7, 8 9, 10}. Y is specifically configured as follows:

Y=0.5, i.e. is configured as a number of OFDM symbols of a half subframe of the related LTE subframes;

Y=1, i.e. is configured as a number of OFDM symbols of one of the related LTE subframes; and Y>1, i.e. is configured as a number of OFDM symbols of a plurality of subframes of the related LTE subframes.

If preemption of a frequency band is successful, a resource occupation signal may start to be transmitted in the remaining n OFDM symbols to prevent the successfully preempted resources from being preempted by other competitors. Or other RS signals such as CSI-RS are transmitted so that the UE starts to perform channel measurement as early as possible.

For example, assume that three OFDM symbols are used for monitoring, and the remaining eleven OFDM symbols, which are approximately 800 us in duration, are used to preempt resources and transmit an occupation signal or other signals after the preemption.

In step 100, there is a third manner to set the subframe structure, which is to modify the LTE TDD subframe structure, use $k_T$ OFDM symbols in a Downlink Pilot Time Slot (DwPTS) in the related TDD subframe structure (also referred to as an uplink signal monitoring window) to monitor an uplink signal, and use $n_T$ OFDM symbols in an Uplink Pilot Time Slot (UpPTS) (also referred to as a resource occupation window) to transmit downlink data. Further, $m_T$ OFDM symbols in the time slot (GP) in the related TDD subframe structure (also referred to as a resource preemption window) are used for resource preemption, that is, a value of $m_T$ may be set to 0, i.e., the resource preemption window may not be configured. When $m_T$=0, the GP may be configured to be included in the second time slot to provide more uplink monitoring opportunities. Or the GP may be configured to be included in the first time slot to provide more downlink time slot opportunities. Herein, $k_T$, $n_T$ and $m_T$ are natural numbers or positive decimals.

The subframe structure according the embodiments of the present document may further be configured with one time slot (i.e., a fourth time slot) for transmitting indication information in one subframe as necessary. The fourth time slot may occupy one or more OFDM symbols. Alternatively, one OFDM symbol is occupied to minimize resource overhead. Of course, it is also possible to configure more OFDM symbols to transmit the above-described indication information as necessary. Configuration of more OFDM symbols to transmit the indication information can improve the capacity and/or the performance of the transmitted indication information, so as to better realize the transmission of the indication information. Alternatively, the fourth time slot starts to be configured from a starting position of one subframe. In this case, OFDM symbols for other time slots correspondingly cannot occupy this part of OFDM symbols.

Alternatively, in a case in which the OFDM symbols of the control domain are used as the second time slot, due to the scenario in which the control domain is used, the number of available OFDM symbols is limited, and the fourth time slot cannot be reserved with too many resources. Therefore, the fourth time slot may be arranged on the first OFDM symbol of the control domain.

Herein, the fourth time slot is used for transmission of one or more of the following indication information:

indication information for indicating downlink indication information for reservation of an uplink time slot;

and/or indication information for indicating a number of symbols occupied by the control domain, i.e., a maximum number of OFDM symbols which may be reserved for uplink reception may be indicated;

and/or indication information for indicating a structure type of the subframe;

and/or indication information for indicating a specific structure of the subframe, for example, the number of and/or positions of OFDM symbols occupied by a region of each portion, existence or inexistence of structures of various portions, etc.;

and/or indication information for indicating configuration information of a subframe structure of subsequent transmission;

and/or indication information for indicating scheduling information for transmitting an unlicensed carrier.

Alternatively, the PCFICH channel may be multiplexed, or a structure of the PCFICH channel may be multiplexed, in which case, as is readily known, it is sufficient to redefine signaling information which is carried by it. If a large amount of control information is required to be transmitted (in particular, a scenario in which scheduling information is required to be transmitted), it is preferable to reuse the PDCCH channel of the related LTE or to multiplex the structure of the PCFICH channel, in which case, as is readily known, it only needs to redefine the signaling information which is carried by it.

The UE can acquire the subframe structure through the indication information of the fourth time slot, so as to perform signal reception/transmission processing based on the subframe structure. With this indication information, more dynamic and flexible configuration and indication of the subframe structure is provided.

For a scenario in which the scheduling information is transmitted, the UE may acquire the scheduling information and perform signal processing based on the scheduling information.

The fourth time slot may only be configured on a part or all of the subframes.

Configuration on a part of subframes can reduce the resource overhead as much as possible. For example, one or more subframes containing the fourth time slot may be configured per period according to periodic configuration. Alternatively, the fourth time slot is configured in a first subframe of the subframe period as a starting configuration. This facilitates the detection of the indication information at the beginning of a period.

Configuration on all the subframes can notify information more timely and dynamically.

Assuming that the period L is preset, and M (M>=0) subframe structures in period and a relative subframe offset N (N∈{0, 1, . . . , L}) from a starting position of each period are configured. Further, it is possible to add and set subframe configuration parameters, i.e., OFDM symbol configuration modes corresponding to the subframes. The time units of these parameters are subframes. Then, in the subframe configuration method in this step, the parameter L may be configured as follows.

L=1 is configured, that is, each subframe has the type of the subframe in this step, which on the one hand, unifies the subframe structure, and simplifies the implementation; and on the other hand, uses the subframe as a period to better achieve resource monitoring and occupation processing;

or L=10 or 5 is configured, that is, a radio frame/a half of the radio frame is used as a period. This reduces the overhead, and the timing relationship achieves better compatibility with the conventional manner;

or subframes in the radio frame except for 0 and 5 are configured to have subframe structures in this step. As the two subframes 0 and 5 can be used to transmit synchronization and broadcast channels, this reduces the influence on the synchronization and broadcast channels;

or a candidate ratio manner of the related TDD is selected, special subframes of the TDD are configured to have the subframe type in this step, and monitoring and/or resource preemption is performed. Alternatively, the related ratio is expanded, and may be configured to be 9:1 or 4:1. This achieves compatibility with the related subframe structure as much as possible, thereby reducing the complexity of the UE implementation;

or candidate subframes in the Enhancement Interference Management and Traffic Adaptation (eMITA) which can be dynamically configured as downlink (DL) are configured as subframes in this step.

The parameter M can be configured as:

M=0, that is, subframes in this step do not appear in a part or all of the periods;

or M=1, that is, one subframe in this step is configured per period;

or M>1, that is, multiple subframes in this step appear per period to provide multiple consecutive time opportunities for monitoring.

$N \in \{0, 1, \ldots, L-1\}$; and the parameter N may be configured as:

N=0, that is, the position of the subframe configuration in this step starts from the beginning of each period; and N>0, that is, the position of the subframe configuration in this step starts from an $N^{th}$ subframe from the beginning of each period. N is not limited to start from the starting position, which provides flexibility of the configuration.

It should be illustrated that as between the uplink and downlink time slot switching takes a certain amount of time, the subframe structure in this step takes into account a delay of the uplink and the downlink switching, that is, as the uplink and the downlink slot time switching takes a certain amount of time, not all the time of the above time window can be completely used for corresponding monitoring, signal transmission or resource preemption, and there will be a part of the time used for the uplink and downlink time slot switching.

In the embodiments of the present document, the TDD frame structure is preferably adopted for the conventional subframes of the unlicensed carrier. Therefore, if the subframe structure in the embodiments of the present document is the corresponding TDD subframe type 2 in the related LTE protocol, it is convenient to subsequently expand to a TDD mode. Herein, the conventional subframes are: the subframe structure described in the embodiments of the present document is new subframe, and other subframes are alternatively set as TDD subframes specified by the related LTE protocol. Of course, other additional subframe structures may be used if required.

In step 101, the base station performs signal reception and transmission based on the set subframe structure.

Step 101 specifically includes performing configuration of a subframe pattern based on the set subframe structure, notifying the terminal (UE) of the configured subframe pattern, and the base station performing signal reception and transmission according to the set subframe structure and the configured subframe pattern.

In this step, performing configuration of a subframe pattern based on the set subframe structure specifically includes uniformly performing determination and configuration of the subframe pattern by Operation Administration and Maintenance (OAM), for convenience of centralized management and coordination, or performing management and configuration by a cell corresponding to a licensed carrier to which the unlicensed carrier belongs, to achieve better flexibility, or performing configuration by other unlicensed carriers in the group of unlicensed carriers (alternatively, other occupied unlicensed carriers in the group of unlicensed carriers), or uniformly performing coordination and configuration by a certain central node such as a base station/cell, which not only takes the flexibility of the configuration into account, but also is convenient for centralized management and coordination.

For the different component carriers, configured patterns of various subframes in this step have the following relationship.

Different component carriers are uniformly configured with the same subframe pattern, especially for component carriers in adjacent channels. This is beneficial for sharing a radio frequency link by many component carriers. And at the same time, it is beneficial for alignment of the uplink and downlink timing relationships of several component carriers, so as to eliminate the problem of uplink and downlink adjacent channel interference caused by different timings.

Or for non-adjacent channel scenarios, different component subcarriers may be configured to use different subcarrier patterns. The configuration of different subframe patterns provides flexibility of the configuration and deployment. At the same time, the subframe patterns are staggered in time domain, which enables the downlink transmissions not to be stopped at the same time, i.e., avoiding transmission from being stopped in a crossing manner.

Or for the purpose of measurements of different systems, it is preferable that a plurality of adjacent cells of the same channel or adjacent channels within the system are configured with the same subframe pattern. This facilitates simultaneously switching to uplink monitoring in the system, which conveniently realizes the monitoring of signals of different systems.

Herein, the opportunity for configuring the sub-frame pattern may be as follows.

The base station configures the subframe pattern of the set subframe structure when the base station performs resource measurement awareness, i.e., monitoring and/or preemption, for a certain unlicensed carrier. That is, the base station performs reception and measurement only in an uplink time slot where the subframe is located when the base station performs measurement awareness and/or preemption on an unlicensed carrier, and does not perform measurement in a downlink time slot corresponding to the subframe structure. That is, in a measurement awareness and/or preemption phase, the unlicensed has not been determined to be occupied by the base station, and the time slot (the first time slot) corresponding to the subframe structure is not used to transmit downlink data, and a time corresponding to the time slot is also not used for measurement awareness and/or preemption. In this way, although the opportunities for measurement awareness and/or preemption are reduced, the base station and the UE use a uniform subframe structure (i.e., a uniform time slot structure), which achieves reduced processing complexity. Therefore, at this time, the subframe pattern of the set subframe structure is configured to unify the behavior of the base station, simplify the configuration, and is convenient for notification to the UE.

Alternatively, the base station temporarily does not configure the subframe pattern of the set subframe structure during the base station performs measurement awareness and/or preemption on a certain unlicensed carrier, and instead, but may be configured to perform measurement awareness for the unlicensed carrier at any time, and when resource preemption is completed, i.e., the unlicensed carrier can be used by the base station, configure the subframe pattern of the set subframe structure on the unlicensed carrier, and perform signal transmission and reception according to the set subframe structure. In other words, in the measurement awareness and/or preemption phase, in order to obtain more opportunities to perform measurement awareness and/or preemption, the system may perform measurement awareness and/or preemption at any time, so that once the unlicensed carrier has been occupied, the system performs subsequent measurement awareness and/or preemption according to the subframe structure and its configuration to determine whether the unlicensed carrier can continue to be used later. In this way, it not only provides the flexibility of configuration of the measurement awareness, but also improves the efficiency of the measurement awareness, which is beneficial to the awareness and preemption of the unlicensed carrier resources.

Alternatively, no matter in which phase, the base station pre-configures the subframe structure when the base station processes the unlicensed carrier, and the system always performs signal transmission and reception according to the set subframe structure, instead of performing different configurations according to different phases. This unifies the behavior of the base station, obviously simplifies the configuration, and is convenient for notification to the UE.

Alternatively, the base station is pre-configured, the UE is notified, and the base station will indicate whether the present subframe (i.e., the fourth time slot mentioned above) is configured with a set frame structure in i OFDM symbols of one subframe. Alternatively, it is arranged in first i OFDM symbols. Alternatively, a first OFDM symbol of the subframe may be used to indicate whether the present subframe is configured as indication information of the set frame structure. The specific implementation may include fixedly configuring possible periodic times at which the subframe may occur, so that the UE can perform blind detection on i OFDM symbols corresponding to these possible times, to determine whether the indication information is transmitted. The fixed configuration may occur in each subframe, or may occur once in each radio frame etc. Alternatively, the licensed carrier dynamically indicates to the UE that the subframe may appear in a $K^{th}$ subframe after receiving the indication, and the UE will perform blind detection of the indication information in the $K^{th}$ subframe according to the notified indication. That is, at this time, the subframe does not appear periodically, but appears based on the notified indication of the licensed carrier. Herein a value of K may be a preset fixed value or may be specifically indicated by signaling of the notified indication of the licensed carrier.

Herein, a value of i may be configured as one or more OFDM symbols. Alternatively, one OFDM symbol is configured to be occupied to minimize resource overhead as much as possible. Of course, it is also possible to configure more OFDM symbols for transmitting the above-described indication information as necessary. Configuration of more OFDM symbols to transmit the indication information can improve the capacity and/or the performance of the transmitted indication information, so as to better realize the transmission of the indication information. It is preferable that the fourth time slot starts to be configured from the starting position of one subframe. Then, the OFDM symbols used for other time slots correspondingly cannot occupy this part of OFDM symbols. Alternatively, the fourth time slot is arranged on a first OFDM symbol of the control domain in a case in which the OFDM symbols of the control domain are used as the second time slot. Due to the scenario in which the control domain is used, the number of available OFDM symbols is limited, and the fourth time slot cannot be reserved with too many resources.

In this step, notifying the UE of the configured subframe pattern includes as follows.

Configuring an unlicensed carrier as a secondary carrier is managed by a licensed carrier as a primary carrier by the licensed carrier. Generally, when the licensed carrier and the unlicensed carrier are aggregated, the licensed carrier is a primary carrier, and the unlicensed carrier is a secondary carrier. Therefore, the subcarrier pattern of the secondary carrier may be configured by the primary carrier, that is, when the secondary carrier is added, the subframe pattern of the set subframe structure is configured by the primary carrier, and the configured subframe pattern is notified to the UE. For example, the configuration is performed by the primary carrier through RRC, and the notification is performed using control signaling of a physical layer. Herein, as the control signaling of the physical layer is relatively high-layer signaling, and the delay is smaller, the notification manner using the control signaling of the physical layer is suitable for a scenario in which the subframe configuration changes dynamically, which is convenient for dynamic and timely notification.

Alternatively, the configured subframe pattern is notified by the secondary carrier itself to the UE. For example, the notification may be performed through a broadcast channel of the secondary carrier, or the subframe pattern may be corresponded to a structure such as a synchronization channel, etc., and the UE acquires a type of the synchronization channel according to blind detection of the synchronization channel to acquire the subframe pattern of the set subframe structure.

Or the configured subframe pattern is notified to the UE on other unlicensed carriers within the group of unlicensed carriers.

The subframe structure configured in the present application may be applicable to the licensed carrier and the unlicensed carrier. However, when a configuration object is an unlicensed carrier, the opportunities to notify the UE of the configured subframe pattern may be as follows.

When the subframe pattern is configured, for carriers which are managed by the same licensed subframe, the subframe types thereof are uniformly configured with the same subframe pattern. On the one hand, the configuration pattern is simplified; and on the other hand, the unlicensed carriers managed by the same licensed carrier are generally located at the same geographical location or adjacent geographical locations, and are configured with the same uniform subframe pattern, which achieves alignment of the uplink and downlink time slot structures, thereby preventing adjacent channel or co-channel interference. Therefore, at this time, the UE is only required to be uniformly notified by the licensed carrier once. When a new secondary carrier is added, the UE considers that the subframe configuration of the newly added carrier is the same as the notified configuration by default.

Alternatively, when subframe pattern is configured, for carriers which are managed by the same licensed carrier, subframe types thereof may be configured with different subframe pattern types. It is mainly applicable to a scenario in which secondary carriers belong to non-adjacent frequency sub-bands and the misalignment of uplink and downlink time slot configurations does not cause serious uplink and downlink interference. Further, multiple carriers in the same frequency subband may be configured to be the same, and carrier sets in different subbands can be configured differently. Therefore, when the UE is notified, configuration may be uniformly performed per a cell set; or a plurality of carriers in a frequency subband have the same configuration in units of a frequency subband, and the configuration is notified uniformly.

The manner to configure the subframe pattern may be changed to the above-described different subframe configuration patterns depending on the practical requirements.

In this step, the base station performing signal reception and transmission according to the set subframe structure and the configured subframe pattern specifically includes as follows The base station performs transmission of a downlink signal when another downlink subframe of the set subframe structure is switched to a downlink transmission mode.

The base station monitors the received signal when the set subframe structure is switched to an uplink reception mode. Herein, signal reception may be performed for adjacent receiving and transmitting nodes of carriers which have configured with the subframe structure according to the embodiments of the present document through uplink monitoring. Alternatively, reception and detection of signaling of the same system may also be achieved through measurement of energy of the signal of the same system and/or different systems. The signal may come from an adjacent cell, may also come from an uplink signal of the UE, or may also come from a signal of a different system. Specifically, For a signal of an adjacent cell, an interference relationship with the signal of the adjacent signal may be measured, for convenience of coordination of time-frequency resources. If only the interference is known but the specific signaling information is not known, a specific configuration thereof cannot be known clearly. That is, if the signaling can be directly detected and analyzed, configuration information can be explicitly acquired from the signaling, and coordination can be easily performed based on the configuration information. Therefore, signaling information transmitted by the adjacent cell can be further identified to achieve coordination and interaction of an air interface; and for an uplink signal of the UE, an occupation condition of carrier resources by the UE and a signal strength relationship between the UE and the base station can be measured. Further, the signaling information transmitted by the UE can be analyzed for convenience of interaction of the signaling. Through the measured signal strength relationship and/or signaling information, it is convenient to schedule the UE and coordinate the occupation relationship of the uplink and downlink resources, etc.

In the subframe structure according to the embodiments of the present document, the first time slot, the second time slot, or the third time slot therein may also be configured not to transmit a signal, and the base station may be selectively configured so that:

the second time slot or the third time slot is used for reception of an uplink signal and schedules transmission of the uplink signal; or is idle; or is switched to reception of a signal for only performing measurement and does not schedule the uplink signal.

the first time slot is idle; or is switched to reception of an uplink signal and schedules transmission of the uplink signal or does not schedule the transmission of the uplink signal, or is switched to reception of a signal for only performing reception and measurement of other signals but does not schedule transmission of the uplink signal.

For example, it is assumed that one of each N subframes, and preferably the first subframe, is configured with the subframe structure according to the embodiments of the present document. The base station does not transmit a downlink signal (N>=1) in the second time slot and/or the third time slot of the first subframe. The specific implementation manners may be as follows.

In a first manner, in the subframe structure according to the embodiments of the present document, a downlink signal is not transmitted and other processing is not performed only in the second time slot and/or the third time slot. Thus, the requirements that a certain proportion of time slots are required to be idle when a time length of L is consecutively occupied can be satisfied.

In a second manner, in the subframe structure according to the embodiments of the present document, a downlink signal is not transmitted in the second time slot and/or the third time slot, and transmission of an uplink signal is scheduled in the time slots. Thus, this part of frequency resources can be sufficiently used as much as possible in a scenario in which the uplink signal is allowed to be transmitted.

In a third manner, a downlink signal is not transmitted in the second time slot and/or the third time slot, and the time slots are configured to be switched to reception of a signal for only performing measurement but do not schedule an uplink signal, so as to use this part of time slot resources for signal measurement and awareness.

The method according to the embodiments of the document further includes step 102, in which the UE performs signal reception and transmission based on the subframe structure of the configured subframe pattern.

At a time corresponding to a subframe having the subframe structure, the UE will assume that the base station will transmit a signal only in a downlink time slot of the subframe.

The step of the UE receiving and transmitting a signal may include as follows.

The UE is configured to perform reception only, and not to transmit information even in the uplink time slots of the subframe structure of the configured subframe pattern. When the base station has occupied the unlicensed carrier, the UE can receive a signal from the base station according to the subframe structure of the configured subframe pattern, and at the same time, receive signals from other base stations or systems. Alternatively, the UE may also be configured to perform reception and measurement of a signal when the base station has not occupied the unlicensed carrier, which can assist the base station in measuring unlicensed carriers which has not been occupied and occupying carrier resources.

And/or the UE alternatively performing the transmission of an uplink signal only in an uplink time slot of the subframe structure for which the subframe pattern is configured, so as to achieve a simplified process.

And the UE is configured to perform transmission of an uplink signal at other times of the uplink time slot of the subframe structure for which the subframe pattern is not configured. For example, if carrier resources have been preempted but there is no time slot to transmit a downlink signal, although it is an uplink time slot of the subframe structure of the configured subframe pattern, it may also be configured for transmission of an uplink signal by the UE. The transmitted signal may be used for carrier occupation, so as to prevent the carrier which has been preempted from being snatched away by other systems.

In this step, a specific manner for the UE to perform signal transmission can be configured by the base station or can be autonomously selected by the UE.

In the manner for the UE to perform signal transmission in this step, the UE may select to perform signal reception and transmission in different manners in different phases, such as a monitoring phase or a data transmission phase for resource occupation or a resource preemption phase. For example, in the consecutive data scheduling and transmission phase, the base station and the UE may be configured with the subframe structure of the same uplink and downlink time slot structure to align reception and transmission with each other. In addition, in order to better achieve the monitoring and resource preemption, in the carrier resource monitoring and resource preemption phase, the UE and the base station may be configured with the subframe structure which is monitored or preempted at the same time.

With respect to the method for signal reception and transmission according to the embodiments of the present document, in a case in which the base station has preempted an unlicensed carrier resource, during use, one subframe having one or more OFDM symbols reserved is configured to have the subframe structure according to the embodiments of the present document. In the reserved OFDM symbols, the base station switches downlink transmission to uplink reception, and uses the reserved OFDM symbols to perform monitoring of an uplink signal. If it is found through the monitoring that there is no other system signal, the unlicensed carrier continues to be occupied and the UE is indicated of whether the current subframe is still available (indicated by the licensed carrier which is also called primary carrier) or whether the period is still available;

If a certain downlink OFDM symbol is not used to transmit data, the method further include includes notifying the UE. Here, when the base station and the UE perform are rate matching, it is assumed that the RE of the OFDM symbol is not available. The REs where other OFDM symbols are located are rate matched according to the related constraint assumptions. Further, if the OFDM symbol which is not used for transmission contains a downlink reference signal, the UE performs measurement and processing assuming that the reference of the OFDM symbol does not exist during the measurement.

In a case in which the base station is in an initial preemption phase, in a scenario in which the OFDM symbols of the control domain are configured for uplink reception and resource preemption, measurement and preemption are performed using the configured OFDM symbols. If the preemption is successful, transmission of a downlink signal and possible downlink scheduling may be performed in the current subframe.

If the time of the control domain of the subframe according to the embodiments of the present document is used for preemption, the method according to the embodiments of the present document further include includes indicating to the UE through a PDCCH of the licensed carrier of whether it is a possible subframe structure according to the embodiments of the present document and the UE detecting possible occupation and scheduling in an enhanced Physical Downlink Control Channel (ePDCCH) domain. This may be indicated by a licensed carrier or an unlicensed carrier.

Further,

The subframe structure according to the embodiments of the present document may be included of one or more consecutive LTE subframes. By taking a construction of two consecutive LTE subframes as an example, total duration of (a monitoring window+a competition window+an occupation window) of the subframe structure according to the embodiments of the present document is two subframes. At this time, (k+m+n) is two subframes, i.e., 28 OFDM symbols, when the way of the subframe structure according to the embodiments of the present document is set using a newly designed complete subframe structure in step 100.

Alternatively, the subframe structure according to the embodiments of the present document may be constituted by consecutive LTE half subframes, that is, a time slot of the LTE subframe. Then, total duration of (a monitoring window+a competition window+an occupation window) of the subframe structure according to the embodiments of the present document is a half subframe. At this time, (k+m+n) is a half subframe, i.e., 7 OFDM symbols, when the subframe structure according to the embodiments of the present document is set using a newly designed complete subframe structure in step 100.

The embodiments of the present document further disclose a computer program comprising program instructions which, when executed by a computer, cause the computer to execute any of the above-described signal processing methods.

The embodiments of the document further disclose a carrier having the computer program carried thereon.

It should be illustrated that the design of the downlink subframe according to the embodiments of the present document can be easily extended to an uplink subframe. That is, when the UE performs resource preemption or aids preemption as carrier monitoring, i.e., measurement awareness, similarly, the signal processing method at the UE side includes presetting a subframe structure.

Herein the subframe structure includes at least a fifth time slot and a sixth time slot.

The fifth time slot is used for transmission of an uplink signal; or is idle; or is switched to reception of a downlink signal and schedules transmission of the downlink signal or does not schedule transmission of the downlink signal; or is switched to reception of a signal for only performing reception and measurement of other signals but does not schedule transmission of the downlink signal.

The six time slot is used for reception of a downlink signal and schedules transmission of the downlink signal; or is idle, or is switched to reception of a signal for only performing measurement but does not schedule the downlink signal.

The UE performs signal reception and transmission based on the set subframe structure.

Herein, the subframe structure further includes a seventh time slot which is used for preemption of radio resources.

Each of the fifth time slot, the sixth time slot and the seventh time slot is included of one or more OFDM symbols, or may also be included of incomplete OFDM symbols.

Herein, the incomplete OFDM symbol means that duration thereof is less than duration of one OFDM symbol or the duration thereof is a total time length of multiple complete OFDM symbols and one incomplete symbol.

Correspondingly, the method further include includes a base station performing signal reception and transmission based on the subframe structure.

The UE may preset the subframe structure as follows. Similarly, it is assumed that the subframe structure is included of n OFDM symbols, herein k OFDM symbols are used for a UE downlink signal monitoring window, m OFDM symbols are used for a resource preemption window, and the remaining (n−k−m) OFDM symbols are used for a resource occupation window for transmitting an occupation signal and/or an uplink reference signal. m may be 0, i.e., no resource occupation window is configured, where k, m and n are natural numbers or positive decimals.

Alternatively, the LTE TDD subframe structure may be modified as follows. $k_T$ OFDM symbols in a DwPTS in the related TDD subframe structure are used for monitoring a downlink signal (also referred to as a downlink signal monitoring window), and $n_T$ OFDM symbols in a UpPTS are used for transmitting an occupation signal and/or an uplink reference signal (also referred to as a resource occupation window). Further, $m_T$ OFDM symbols in a time slot (GP) in the related TDD subframe structure are used for resource preemption (also referred to as a resource preemption window), that is, a value of $m_T$ may be 0, i.e., no resource preemption window is configured, where $k_T$, $n_T$ and $m_T$ are natural numbers or positive decimals.

Alternatively, in the related LTE uplink subframe, the last OFDM symbol may be used for transmitting an uplink SRS. It may be modified by the UE according to the embodiments of the present document, and when the UE finds through the monitoring that the carrier can be occupied, the UE transmits an occupation indication signal in the last OFDM symbol to notify the base station that the carrier can be occupied. The base station may acquire the indication information from the UE that it can be occupied by detecting the occupation signal transmitted in the OFDM symbol.

Similarly, at the UE side, the subframe structure according to the embodiments of the present document also considers the delay of the uplink and downlink switching.

In the above various embodiments, other subframes which are not configured as the subframe structure according to the embodiments of the present document may be configured as downlink subframes, or may also be configured as uplink subframes.

Alternatively, these uplink subframes are configured before the subframes having the subframe structure according to the embodiments of the present document, and the downlink subframes are configured after the subframes having the subframe structure according to the embodiments of the present document. This achieves reduced resource overhead of the uplink and downlink time slot switching as much as possible.

The embodiments of the present document further disclose a computer program comprising program instructions which, when executed by a computer, cause the computer to execute any of the above-described signal processing methods.

The embodiments of the document further disclose a carrier having the computer program carried thereon.

Based on the signal processing method according to the embodiments of the present document, the embodiments of the present document further provide a base station for presetting a subframe structure comprising at least a first time slot and a second time slot.

Herein the first time slot is used for transmission of a downlink signal; or is idle; or is switched to reception of an uplink signal and schedules transmission of the uplink signal or does not schedule transmission of the uplink signal; or is switched to reception of a signal for only performing reception and measurement of other signals but does not schedule transmission of the uplink signal.

The second time slot is used for reception of the uplink signal and schedules transmission of the uplink signal; or is idle, or is switched to reception of a signal for only performing measurement but does not schedule the uplink signal; and the base station performing signal reception and transmission based on the set subframe structure.

The subframe structure further includes a third time slot which is used for preemption of radio resources.

Each of the first time slot, the second time slot and the third time slot is included of one or more OFDM symbols, or may also be included of incomplete OFDM symbols.

Herein, the incomplete OFDM symbol means that duration thereof is less than duration of one OFDM symbol or the duration thereof is a total time length of multiple complete OFDM symbols and one incomplete symbol.

The configuration of the time slots at the base station side can be known with reference to the information processing method at the base station side described above, and will not be described here.

The embodiments of the present document further provide a terminal for presetting a subframe structure including at least a fifth time slot and a sixth time slot.

Herein the fifth time slot is used for transmission of an uplink signal; or is idle; or is switched to reception of a downlink signal and schedules transmission of the downlink signal or does not schedule transmission of the downlink signal; or is switched to reception of a signal for only performing reception and measurement of other signals but does not schedule transmission of a downlink signal.

The six time slot is used for reception of a downlink signal and schedules transmission of the downlink signal; or is idle, or is switched to reception of a signal for only performing measurement but does not schedule the downlink signal.

Signal reception and transmission is performed based on the set subframe structure.

The subframe structure further includes a seventh time slot which is used for preemption of radio resources.

Each of the fifth time slot, the sixth time slot and the seventh time slot is included of one or more OFDM symbols, or may also be included of incomplete OFDM symbols.

Herein, the incomplete OFDM symbol means that duration thereof is less than duration of one OFDM symbol or the duration thereof is a total time length of multiple complete OFDM symbols and one incomplete symbol.

The configuration of these time slots at the UE side can be known with reference to the information processing method at the base station side described above, and will not be described here.

The above description is only the preferred embodiment of the present document and is not intended to limit the protection scope of the present document. Any modification, equivalent substitution, improvement etc. made within the spirit and principle of the present document should be included within the protection scope of the present document.

INDUSTRIAL APPLICABILITY

With the method according to the technical solutions of the present document, the fair use of the unlicensed carrier spectrum is improved, thereby effectively utilizing the unlicensed carrier spectrum. Therefore, the present document has very strong industrial applicability.

What is claimed is:
1. A signal processing method, comprising:
presetting a subframe structure comprising at least a first time slot and a second time slot, wherein
the first time slot is used for transmission of a downlink signal; or is idle; or is switched to reception of an uplink signal and schedules transmission of the uplink signal or does not schedule transmission of the uplink signal; or is switched to reception of a signal for only performing reception and measurement of other signals except for the uplink signal but does not schedule transmission of the uplink signal;

the second time slot is used for reception of an uplink signal and schedules transmission of the uplink signal; or is idle; or is switched to reception of a signal for only performing measurement but does not schedule the uplink signal; and a base station performing signal reception and transmission based on the set subframe structure; wherein the subframe structure further comprises:

a fourth time slot which is different from the first time slot and the second time slot and used for transmission of indication information; wherein the fourth time slot of the subframe structure is used for transmission of the following indication information:

indication information for indicating a number of symbols occupied by a control domain;

or indication information for indicating configuration information of a subframe structure of subsequent transmission;

or indication information for indicating scheduling information for transmitting an unlicensed carrier; wherein the step of the base station performing signal reception and transmission based on the set subframe structure comprises:

the base station performing configuration of a subframe pattern based on the set subframe structure;

the base station notifying the UE of the configured subframe pattern; and the base station performing signal reception and transmission according to the set subframe structure and the configured subframe pattern; wherein, the step of the base station performing configuration of a subframe pattern based on the set subframe structure comprises:

the base station performing configuration of the subframe pattern of the set subframe structure when the base station performs resource awareness and/or preemption for an unlicensed carrier;

or the base station temporarily not performing configuration of the subframe pattern of the set subframe structure during the base station performing measurement awareness and/or preemption on an unlicensed carrier, and performing configuration of the subframe pattern of the set subframe structure on the unlicensed carrier when the base station performs measurement awareness and completes resource preemption for the unlicensed carrier at any time;

or the base station always performing signal transmission and reception according to the set subframe structure when the base station processes an unlicensed carrier;

or indicating whether one subframe is configured to the set frame structure in first i OFDM symbols of the subframe; wherein when the set subframe structure is suitable for an unlicensed carrier, when the subframe pattern is configured, for carriers managed by the same licensed carrier, subframe types thereof are uniformly configured with the same subframe pattern, and the step of notifying the UE of the set subframe pattern comprises: uniformly notifying the UE once by the licensed carrier; and when a new secondary carrier is added, the UE considers that the subframe configuration of the newly added carrier is the same as the notified configuration by default;

or when the subframe pattern is configured, for the carriers managed by the same licensed carrier, the subframe types thereof are configured with different subframe patterns, and the step of notifying the UE of the set subframe pattern comprises: uniformly performing configuration per a cell set, and notifying the UE; or using a frequency subband as a unit, making a plurality of carriers in a frequency subband have the same configuration, and notifying the UE.

2. The signal processing method according to claim 1, wherein the subframe structure further comprises: a third time slot which is used for preemption of radio resources;

wherein each of the first time slot, the second time slot, the third time slot and the fourth time slot is comprised of one or more Orthogonal Frequency Division Multiplexing (OFDM) symbols, or is comprised of incomplete OFDM symbols.

3. The signal processing method according to claim 1, further comprising: a terminal UE performing signal reception and transmission based on the subframe structure.

4. The signal processing method according to claim 3, wherein the subframe structure is a downlink subframe structure; and the step of presetting a subframe structure comprises:
selecting OFDM symbols in the downlink subframe structure except for symbols being mapped to Cell-specific Reference Signal (CRS), Channel State Information Reference Signal (CSI-RS), Demodulation Reference Signal (DMRS), or Primary Synchronization Signal (PSS)/Secondary Synchronization Signal (SSS), to be reserved as the second time slot; or selecting an OFDM symbol after one or more OFDM symbols from a subframe starting point in the downlink subframe structure as a starting point of the second time slot; or reserving OFDM symbols of a control domain of the downlink subframe structure as the second time slot;

wherein the step of reserving OFDM symbols of a control domain of the downlink subframe structure as the second time slot comprises: reserving the second time slot from a second OFDM symbol of a subframe of the OFDM symbols of the control domain;

wherein the subframe structure further comprises a fourth time slot which is used for transmission of indication information, and the step of presetting a subframe structure comprises: setting the fourth time slot to comprise a first OFDM symbol of the control domain.

5. The signal processing method according to claim 3, wherein the subframe structure is an LTE uplink subframe structure; and the step of presetting a subframe structure comprises: selecting OFDM symbols in the LTE uplink subframe structure except for symbols being mapped to SRS or DMRS, to be reserved as the first time slot.

6. The signal processing method according to claim 1, wherein the subframe structure is a newly added subframe structure comprising n OFDM symbols; wherein, the step of presetting a subframe structure comprises: using k OFDM symbols of the newly added subframe structure as the first time slot; and using remaining (n−k) OFDM symbols as the second time slot; wherein n is a number of OFDM symbols corresponding to Y LTE subframes, where Y∈{0.5, 1, 2, 3, 4, 5, 6, 7, 8 9, 10}, and n and k are natural numbers or positive decimals.

7. The signal processing method according to claim 6, wherein the k OFDM symbols are first k OFDM symbols of the newly added subframe structure.

8. The signal processing method according to claim 7, wherein the subframe structure further comprises a third time slot which is used for preemption of radio resources; and m OFDM symbols in the new subframe structure are the third time slot, and at this time, (n−k−m) OFDM symbols in the subframe structure are the second time slot, wherein m is a natural number or a positive decimal;

wherein a value of k is a preset fixed value;

or the value of k meets k≤X, and it is satisfied that s consecutive OFDM symbols are detected to be idle before the value of k reaches a maximum value X, where s≤k, and s and X are both preset natural numbers or positive decimals.

9. The signal processing method according to claim 1, wherein the subframe structure is set based on a TDD subframe structure; and the step of presetting a subframe structure comprises: setting $k_T$ OFDM symbols in a Downlink Pilot Time Slot (DwPTS) in the TDD subframe structure to be the second time slot; and setting $n_T$ OFDM symbols in an Uplink Pilot Time Slot (UpPTS) in the TDD subframe structure to be the first time slot, where $k_T$ and $n_T$ are natural numbers or positive decimals;

wherein the subframe structure further comprises a third time slot which is used for preemption of radio resources; and the step of presetting a subframe structure further comprises: using $m_T$ OFDM symbols in a time slot GP in the TDD subframe structure as the third time slot, wherein $m_T$ is a natural number or a positive decimal.

10. The signal processing method according to claim 1, further comprising:

presetting a period of L, and configuring M(N>=0) said subframe structures in each period L and a relative subframe offset N from a starting position of each period; wherein the step of presetting a subframe structure comprises:

setting L=1, wherein each subframe in each period L has the sub-frame structure;

or setting L=10 or 5, with a period of a radio frame/a half of the radio frame;

or setting other subframes in the radio frame except for 0 and 5 as the subframe structure;

or configuring special subframes of the TDD as the subframe structure;

or configuring candidate subframes in Enhancement Interference Management and Traffic Adaptation (eIMTA) which can be dynamically configured as DL as the subframe structure;

setting N∈{0, 1, . . . , L−1};

setting M=1;

or M consecutive said subframes;

or M equally spaced subframes.

11. The signal processing method according to claim 1, wherein the step of the base station performing configuration of a subframe pattern based on the set subframe structure comprises:

uniformly performing determination and configuration by Operation Administration and Maintenance (OAM);

or performing management and configuration by a cell corresponding to a licensed carrier to which the unlicensed carrier belongs;

or performing configuration by other unlicensed carriers in a group of unlicensed carriers;

or uniformly performing coordination and configuration by a certain central node, wherein the central node is a base station/cell.

12. The signal processing method according to claim 1, wherein the step of the base station notifying the UE of the configured subframe pattern comprises:

when adding an unlicensed carrier as a secondary carrier, configuring the subframe pattern of the set subframe structure by a licensed carrier as a primary carrier and notifying the UE of the configured subframe pattern;

or notifying the UE of the configured subframe pattern by the secondary carrier itself;

or notifying the UE of the configured subframe pattern on other unlicensed carriers within a group of unlicensed carriers.

13. The signal processing method according to claim 1, wherein the step of the base station transmitting a downlink signal according to the set subframe structure and monitoring a received uplink signal comprises:

when other downlink subframes of the set subframe structure are switched to a downlink transmission mode, the base station performing transmission of the downlink signal, and when the set subframe structure is switched to an uplink reception mode, the base station monitoring the received signal.

14. The signal processing method according to claim 3, wherein the step of the UE performing signal reception and transmission comprises:

configuring the UE to perform reception only;

and/or the UE performing transmission of the uplink signal only in an uplink time slot of the subframe structure for which the subframe pattern is configured;

and/or the UE performing transmission of the uplink signal at other times of the uplink time slot of the subframe structure for which the subframe pattern is not configured.

15. The signal processing method according to claim 3, further comprising: the UE selecting to perform signal reception and transmission in different manners in different phases during the signal reception and transmission.

16. The signal processing method according to claim 1, further comprising: when the base station has preempted a carrier resource, configuring one subframe to have the subframe structure in use; and in OFDM symbols of the subframe structure, the base station switching downlink transmission to uplink reception and monitoring the uplink signal using reserved OFDM symbols;

wherein if it is found through the monitoring that there is no other system signal, continuing to occupy the unlicensed carrier and indicating to the UE whether a current subframe is still available or whether a period is still available;

wherein if a certain downlink OFDM symbol is not used to transmit data, the method further comprises: notifying the UE.

17. The signal processing method according to claim 1, further comprising: when the base station is in an initial preemption phase, in a scenario in which the OFDM symbols of the control domain are configured for uplink reception and resource preemption, performing measurement and preemption using the configured OFDM symbols; and if the preemption is successful, performing transmission of the downlink signal and downlink scheduling in the current subframe.

18. The signal processing method according to claim 1, wherein,
the subframe structure is comprised of one or more consecutive LTE subframes; or
the subframe structure is comprised of consecutive LTE half subframes.

19. The signal processing method according to claim 1, wherein the fourth time slot of the subframe structure is used for transmission of the following indication information:
indication information for indicating downlink indication information for reservation of an uplink time slot;
or indication information for indicating a structure type of current subframe;
or indication information for indicating a specific structure of current subframe.

20. A base station configured to preset a subframe structure comprising at least a first time slot and a second time slot, wherein
the first time slot is used for transmission of a downlink signal; or is idle; or is switched to reception of an uplink signal and schedules transmission of the uplink signal or does not schedule transmission of the uplink signal; or is switched to reception of a signal for only performing reception and measurement of other signals except for the uplink signal but does not schedule transmission of the uplink signal; and
the second time slot is used for reception of an uplink signal and schedules transmission of the uplink signal; or is idle; or is switched to reception of a signal for only performing measurement but does not schedule the uplink signal; and
the base station is configured to perform signal reception and transmission based on the set subframe structure; wherein the subframe structure further comprises:
a fourth time slot which is different from the first time slot and the second time slot and used for transmission of indication information; wherein the fourth time slot of the subframe structure is used for transmission of the following indication information:
indication information for indicating a number of symbols occupied by a control domain;
or indication information for indicating configuration information of a subframe structure of subsequent transmission;
or indication information for indicating scheduling information for transmitting an unlicensed carrier; wherein the base station is configured to perform signal reception and transmission based on the set subframe structure comprising:
the base station is configured to perform configuration of a subframe pattern based on the set subframe structure;
the base station is configured to notify the UE of the configured subframe pattern; and
the base station is configured to perform signal reception and transmission according to the set subframe structure and the configured subframe pattern; wherein, the base station is configured to perform configuration of the subframe pattern based on the set subframe structure comprising:
the base station is configured to perform configuration of the subframe pattern of the set subframe structure when the base station performs resource awareness and/or preemption for an unlicensed carrier;
or the base station is configured to temporarily not perform configuration of the subframe pattern of the set subframe structure during the base station performing measurement awareness and/or preemption on an unlicensed carrier, and performing configuration of the subframe pattern of the set subframe structure on the unlicensed carrier when the base station performs measurement awareness and completes resource preemption for the unlicensed carrier at any time;
or the base station is configured to always perform signal transmission and reception according to the set subframe structure when the base station processes an unlicensed carrier;
or indicate whether one subframe is configured to the set frame structure in first i OFDM symbols of the subframe; wherein when the set subframe structure is suitable for an unlicensed carrier,
when the subframe pattern is configured, for carriers managed by the same licensed carrier, subframe types thereof are uniformly configured with the same subframe pattern, and the step of notifying the UE of the set subframe pattern comprises: uniformly notifying the UE once by the licensed carrier; and when a new secondary carrier is added, the UE considers that the subframe configuration of the newly added carrier is the same as the notified configuration by default;
or when the subframe pattern is configured, for the carriers managed by the same licensed carrier, the subframe types thereof are configured with different subframe patterns, and the step of notifying the UE of the set subframe pattern comprises: uniformly performing configuration per a cell set, and notifying the UE; or using a frequency subband as a unit, making a plurality of carriers in a frequency subband have the same configuration, and notifying the UE.

21. The base station according to claim 20, wherein the subframe structure further comprises a third time slot which is used for preemption of radio resources;
wherein each of the first time slot, the second time slot, the third time slot and the fourth time slot is comprised of one or more Orthogonal Frequency Division Multiplexing (OFDM) symbols, or is comprised of incomplete OFDM symbols.

* * * * *